United States Patent
Ju et al.

(10) Patent No.: US 6,197,139 B1
(45) Date of Patent: Mar. 6, 2001

(54) METHOD FOR ELECTROSTATIC THERMAL BONDING OF A PAIR OF GLASS SUBSTRATES BY UTILIZING A SILICON THIN FILM

(75) Inventors: Byeong-Kwon Ju; Myung-Hwan Oh; Woo-Beom Choi, all of Seoul (KR)

(73) Assignee: Korea Institute of Science & Tech. (KR)

( * ) Notice: Subject to any disclaimer, the term of this patent is extended or adjusted under 35 U.S.C. 154(b) by 0 days.

(21) Appl. No.: 09/226,949

(22) Filed: Jan. 8, 1999

(30) Foreign Application Priority Data

Jan. 9, 1998 (KR) .................................................... 98-367

(51) Int. Cl.⁷ ..................................................... B32B 17/00
(52) U.S. Cl. .............................. 156/99; 156/273.1; 65/40; 65/43
(58) Field of Search ............................. 156/99, 150, 151, 156/272.2, 273.1, 310; 65/40, 43; 219/633, 765

(56) References Cited

U.S. PATENT DOCUMENTS

| | | | |
|---|---|---|---|
| 4,452,624 | * 6/1984 | Wohltjen et al. | .......................... 65/40 |
| 5,141,148 | * 8/1992 | Ichiyawa | .......................... 228/163.12 |
| 5,396,042 | * 3/1995 | Ishida et al. | .......................... 219/78.02 |
| 5,695,590 | * 12/1997 | Willcox et al. | .................... 156/272.2 |

* cited by examiner

Primary Examiner—Michael W. Ball
Assistant Examiner—John T. Haran
(74) Attorney, Agent, or Firm—Ostrolenk, faber, Gerb & Soffen, LLP

(57) ABSTRACT

An electrostatic thermal bonding method for bonding a pair of glass substrates, is capable of solving the problems such as a contamination of a device and incomplete vacuum packaging due to gas generated during the bonding of glass substrates utilizing a conventional epoxy or frit. The electrostatic thermal bonding method uses a silicon-glass bonding mechanism. First, a silicon thin film is deposited on a metal thin film formed on a side of one glass substrate, and the two glass substrates are brought face to face with each other by bringing the silicon thin film into contact with the surface of the other glass substrate. A predetermined direct current voltage is applied between the metal thin film and the other glass substrate under a predetermined temperature, thereby the bonding between glass substrates is performed. In the glass-glass bonding method utilizing the silicon thin film, the direct current voltage in the range of 0 to 1000V is applied under a bonding temperature between 100 to 500° C. and the elements are combined between a surface of the glass and a surface of the silicon thin film. Therefore, such a bonding results in an improved bonding strength and an improved vacuum packaging.

9 Claims, 3 Drawing Sheets

METHOD FOR ELECTROSTATIC THERMAL BONDING OF A PAIR OF GLASS SUBSTRATES BY UTILIZING A SILICON THIN FILM

BACKGROUND OF THE INVENTION

1. Field of the Invention

The present invention is directed to an electrostatic thermal bonding of glass substrates, and in particular to an improved electrostatic thermal bonding method capable of easily and solidly bonding a pair of glass substrates without using an adhesive or a high-temperature process.

2. Description of the Background Art

An electrostatic thermal bonding method was introduced in 1969, and then a silicon-glass bonding and a silicon-silicon bonding utilizing a glass thin film have been used in packaging of miniature devices. The thermal expansion coefficient of a glass used for the electrostatic thermal bonding is almost identical with that of a silicon, and materials containing metallic elements therein having a remarkable ionization tendency such as natrium and lithium are used for the glass to be bonded. For the silicon-glass bonding, when the silicon substrate and glass substrates are brought face to face with each other and heated to a predetermined temperature, and then the metal elements inside the glass substrates are ionized into the ionic condition having constant electric charges. Here, in the case that an external direct current voltage of a cathode is applied to the glass substrates, the ionized metal ions are moved into the cathode due to the electric field generated at both end portions of the silicon-glass interface and a space charge section is formed at the interface of the silicon-glass. A strong electrostatic force is generated due to the space charges. The silicon and the glass substrates are forced to be pulled toward each other by the electrostatic force, and thus a bonding of the silicon and the glass substrates is performed.

However, in the case of a flat-plate display device, the bonding of the two glass substrates is conventionally performed utilizing a method for bonding a pair of glass substrates by putting glass frit on a surface of one glass substrate, facing the pair of substrates to one another, and heating the glass substrates to a temperature of about 450 to 600° C. for melting the glass frit, whereby the pair of glass substrates are bonded As mentioned above, the conventional electrostatic thermal bonding methods have been limited to a silicon-glass bonding and silicon-silicon bonding utilizing a glass thin film. That is, the conventional electrostatic thermal bonding methods have not been adopted for a glass—glass bonding related to a display device.

In the studies recently performed with regard to the packaging of flat-plate display devices, a glass—glass bonding using a glass frit is utilizing for bonding glass substrates. However, such a packaging, i.e., the conventional glass—glass bonding method has disadvantages in that the longevity of the device is reduced due to the high temperature bonding and the device is contaminated by gas generated during the melting of the glass frit, which results in inferior effect on the condition that a vacuum packaging should be performed.

SUMMARY OF THE INVENTION

It is therefore a primary object of the present invention to provide a method for bonding glass substrates in a solid condition by using a silicon-glass bonding mechanism which is a basic concept of the electrostatic thermal bonding, without using an adhesive or a high temperature process.

It is another object of the present invention to provide a vacuum packaging method by bonding glass substrates, which method is capable of achieving a excellent vacuum degree between the glass substrates by sequentially forming a metal thin film electrode and a silicon thin film on one glass substrate and applying a predetermined direct current voltage between the other glass substrate and the metal thin film.

In order to achieve the above-described objects, in accordance with the present invention, there is provided a thermal bonding method for bonding glass substrates by utilizing a silicon thin film comprising: forming a metal thin film electrode on a surface of one of two glass substrates; forming a silicon substrate on the metal thin film; bringing the silicon substrate into contact with the other glass substrate; and applying a direct current voltage in the range of 0 to 1000V between the metal thin film and the glass substrate on which the metal thin film is not formed under a temperature of between 100° C. and 500° C. In addition, it is preferable that the process for applying a predetermined direct current voltage between the metal thin film and the glass substrate is performed by connecting an anode of a direct current voltage source to the metal thin film formed on the one glass substrate, and connecting a cathode of the direct current voltage source to the other glass substrate.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

The electrostatic thermal bonding method for bonding glass substrates by utilizing a silicon thin film in accordance with the present invention will now be described in detail with reference to the accompanying drawings.

A metal thin film serving as an electrode is formed on a surface of one of the two glass substrates to be bonded, and a silicon substrate being involved in the bonding is formed on the metal thin film. Then, both substrates are brought face to face with each other by contacting the silicon substrate and the other glass substrate surface, and then a predetermined direct current voltage is applied between the metal thin film serving as an electrode and the other glass substrate under a predetermined temperature. At this time, the bonding of the two substrates is performed by bonding at the silicon-glass interface. The glass substrates are made of materials containing metallic elements having a superior ionization tendency such as natrium and lithium. When the silicon thin film and the respective glass substrates are brought face to face with each other and heated over the predetermined temperature, the metal elements in the glass substrates are ionized and maintained in the ionic condition having constant electric charges. Here, when the cathode of an external direct current voltage source is applied to the glass substrates and the anode of the external direct current voltage source is applied to the silicon thin film, the ionized metal ions are moved toward the cathode due to an electric field produced between the silicon thin film and the glass substrate, and the electrons inside the silicon thin film are moved toward the anode, and thus a space charge section is formed at the silicon-glass interface. A strong electrostatic force is generated due to the space charges, which causes oxygen elements inside the glass substrates to be urged toward the surface of the glass, and a Si—O bonding is formed at the glass-silicon interface, and thereby a bonding of the silicon thin film and the glass substrates is performed, which accordingly results in the bonding of the two glass substrates.

The electrostatic thermal bonding method for bonding the glass substrates by utilizing a silicon thin film according to the first embodiment of the present invention will now be described in detail with reference to FIGS. 1a to 1e.

Figure 1A:
FIGS. 1a to 1e illustrate sequential process steps of an electrostatic thermal bonding method for bonding glass substrates in accordance with the present invention.
Figure 1B:
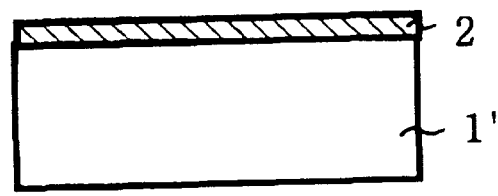

As shown in FIG. 1a, the two glass substrates 1, 1' to be bonded are washed clean with methanol, acetone and deionized water in order. Then, as illustrated in FIG. 1b, a metal thin film 2 serving as an electrode is formed on the surface of one glass substrate 1' of the two glass substrates. In this case, the metal thin film serving as the electrode comprises one of an Indium Tin Oxide (ITO) transparent electrode, aluminum, chrome, molybdenum or titanium. Such a metal material is deposited on the glass substrate utilizing one of a sputtering method, an electron beam deposition method, a thermal deposition method and a chemical vapor deposition (CVD) method.

Figure 1C:
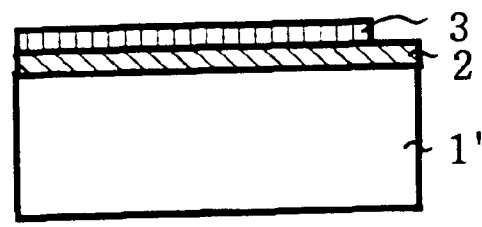

As shown in FIG. 1c, the silicon thin film 3 involved in the bonding is deposited on the metal thin film 2 formed on the glass substrate 1' by using a deposition method, such as a sputtering method, an electron beam deposition method, a thermal deposition method or a chemical vapor deposition (CVD) method.

Figure 1D:
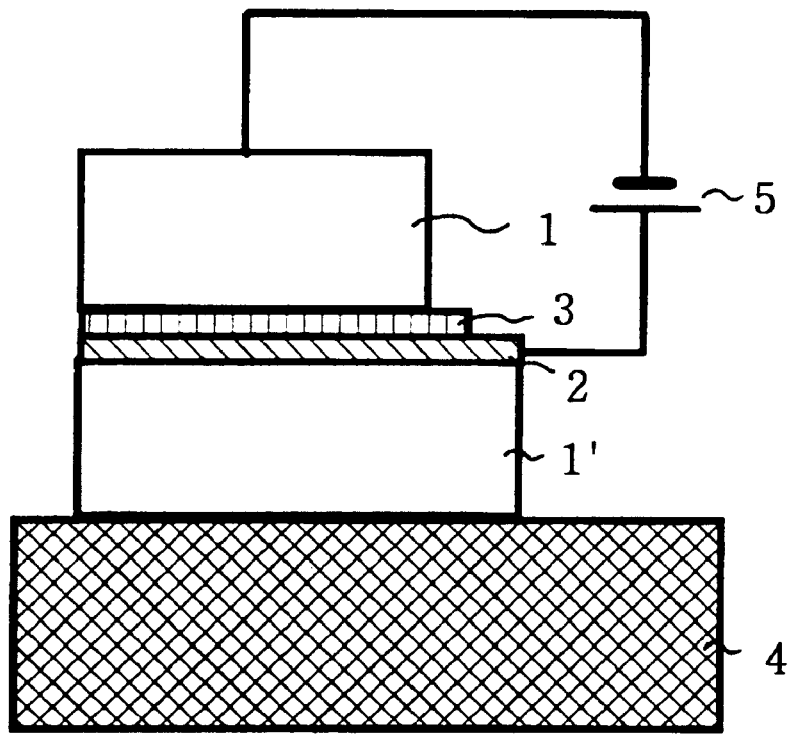

As illustrated in FIG. 1d, the glass substrates 1, 1' are brought face to face with each other by bringing the silicon thin film 3 into contact with the surface of the glass substrate 1 without the metal thin film and silicon thin film, and the glass substrates 1, 1' are put on a heating device 4. Then, the glass substrate 1 is connected to the cathode of a direct current voltage source 5 and the metal thin film electrode 2 on the other glass substrate 1' is connected to the anode. Next, the two glass substrates 1, 1' are heated to a temperature of 100 to 500° C. and a direct current voltage in the range of 0 to 1000V is applied thereto.

Figure 1E:
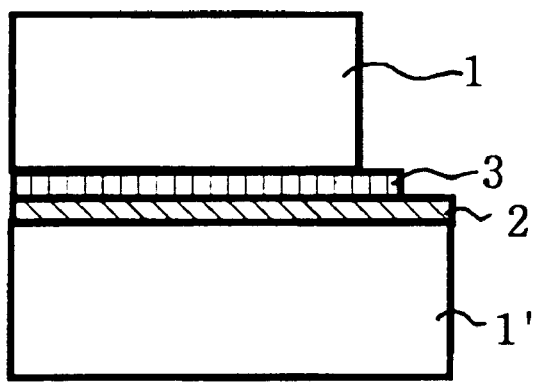

The heated glass substrates 1, 1' are slowly cooled and, when the glass substrates 1, 1' reach a temperature below 100° C., the applied direct current voltage is removed, and thereby us the bonded glass substrates 1, 1' are obtained, as illustrated in FIG. 1e.

Figure 2A:
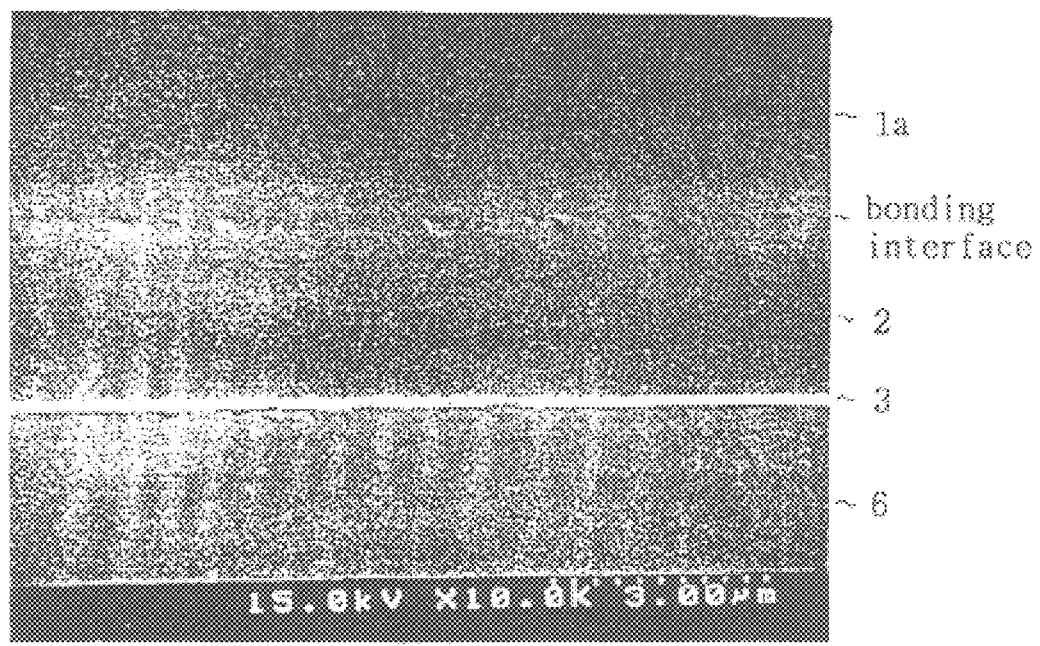
FIGS. 2a and 2b are electron microscope cross-sectional microphotographs of glass substrates bonded in accordance with the present invention.
Figure 2B:
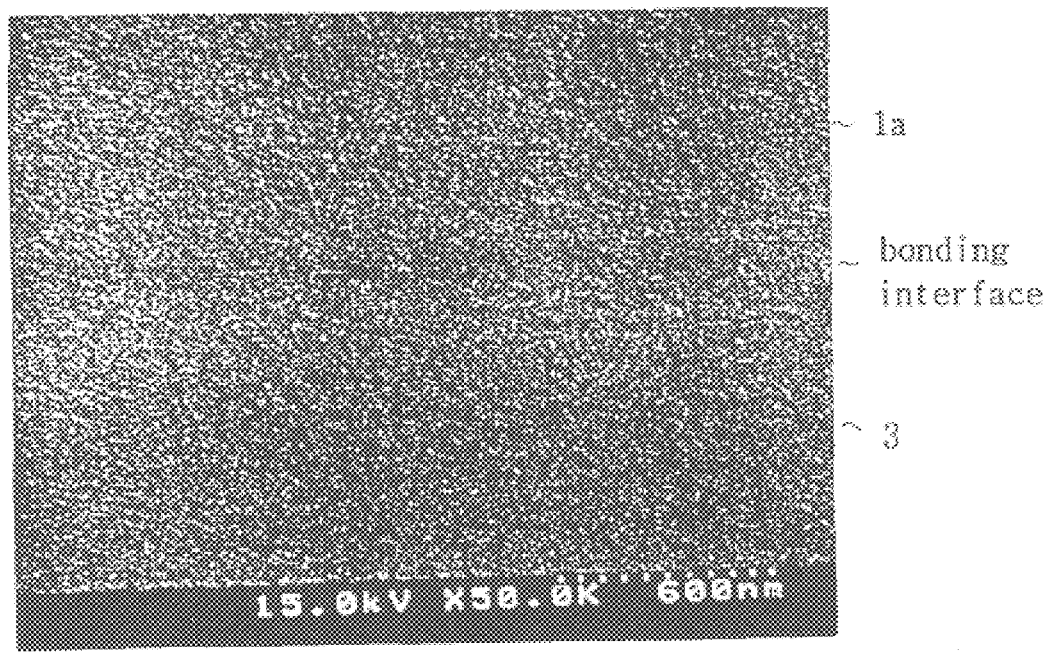

FIGS. 2a and 2b are electron microscope images of a cross-sectional of the bonded structure of glass substrate 1/silicon thin film 3/metal thin film 2 for electrode/glass substrate 1' for microscopically evaluating the bonding interface of the glass substrates bonded by using the silicon thin film in accordance with the present invention. FIG. 2b is an enlarged view of FIG. 2a. As shown in FIG. 2b, the two glass substrates are firmly bonded and the bonding interface thereof is seldom indicated, because one glass substrate and the silicon thin film on the other glass substrate are completely combined.

As described so far, in accordance with the basic concept of the electrostatic thermal bonding of the present invention, namely, a silicon-glass bonding mechanism, the silicon thin film is deposited on one glass substrate on which an electrode is deposited, the two glass substrates are brought face to face with each other, a predetermined direct current voltage is applied between the electrode on one glass substrate and the other glass substrate under a predetermined temperature, and thereby the complete glass—glass bonding is performed.

As the present invention may be embodied in several forms without departing from the spirit of essential characteristics of the invention, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for electrostatic thermal bonding of a pair of glass substrates, comprising the steps of:

forming a metal thin film electrode on a surface of one of two glass substrates to be bonded;

forming a silicon thin film on the metal thin film electrode;

bringing the two glass substrates face to face with each other by bringing the silicon thin film on the one glass substrate into contact with a surface of the other glass substrate, and heating the glass substrates;

applying a predetermined direct current voltage between the pair of glass substrates under a predetermined temperature; and cooling the bonded glass substrates and removing the applied direct current voltage at a predetermined temperature.

2. The method of claim 1, wherein the metal thin film electrode comprises one of an ITO transparent electrode, aluminum, chrome, molybdenum or titanium, and such material is deposited on the surface of the one glass substrate by one of a sputtering, an electron beam deposition, a thermal deposition and a chemical vapor deposition CVD.

3. The method of claim 1, wherein the silicon thin film is deposited on the metal thin film electrode by one of a sputtering, an electron beam deposition, a thermal deposition and a chemical vapor deposition (CVD), the silicon thin film having a construction selected from a single crystalline, a polycrystalline and an amorphous.

4. The method of claim 1, wherein the step for applying a predetermined direct current voltage is performed by connecting an anode of a direct current voltage source to the metal thin film formed on the one glass substrate, and connecting a cathode of the direct current voltage source to the other glass substrate.

5. The method of claim 1, wherein the step for applying a predetermined direct current voltage between the pair of glass substrates under a predetermined temperature is performed under a vacuum.

6. The method of claim 1, wherein the heating of a pair of glass substrates is performed in the range of 100° C. to 500° C.

7. The method of claim 6, wherein the applied direct current voltage is in the range of 0V to 1000V.

8. The method of claim 1, wherein the applied direct current voltage is in the range of 0V to 1000V.

9. The method of claim 1, wherein the pair of bonded glass substrates are slowly cooled, and the application of direct current voltage is stopped when glass substrates reach a temperature of below 100° C.

* * * * *